Figure 1:
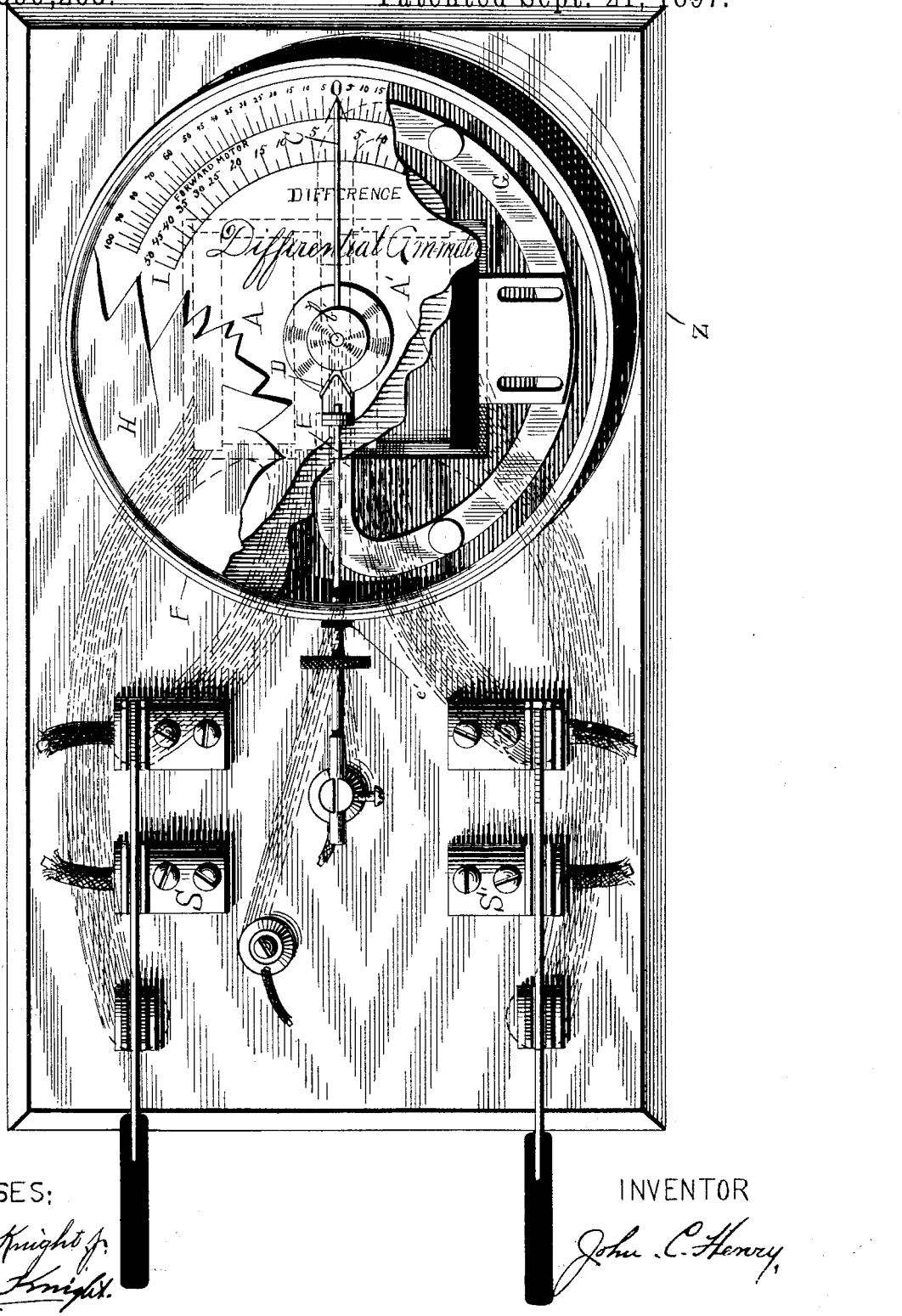

(No Model.) 3 Sheets—Sheet 1.

J. C. HENRY.
ELECTRIC MEASURING APPARATUS.

No. 590,263. Patented Sept. 21, 1897.

WITNESSES:
Geo. H. Knight Jr.
Wm. E. Knight.

INVENTOR
John C. Henry

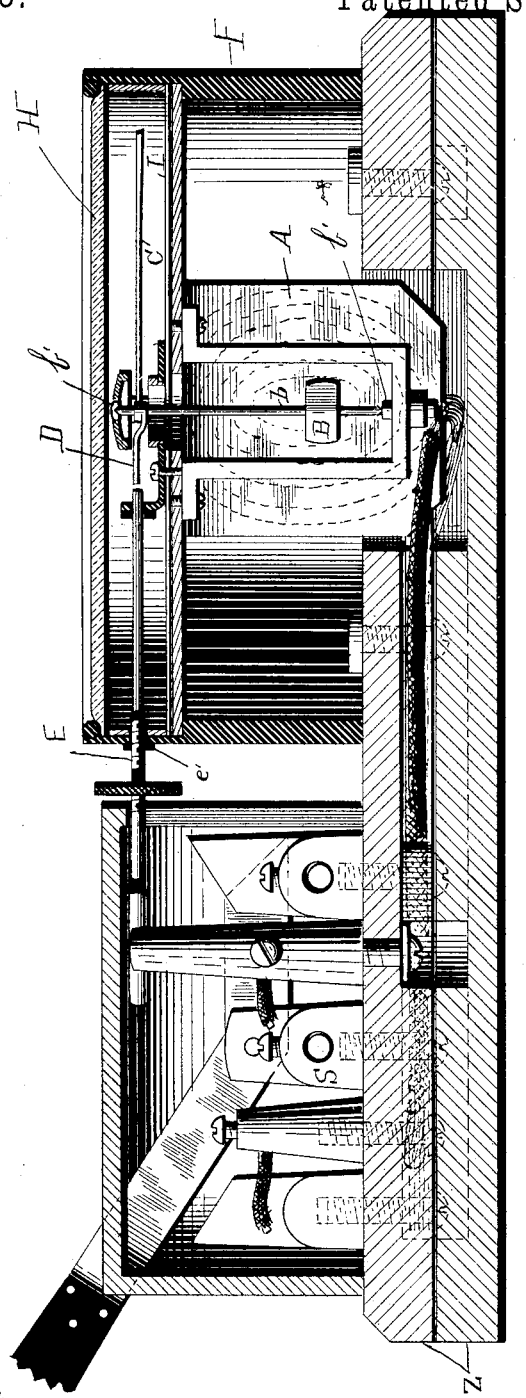

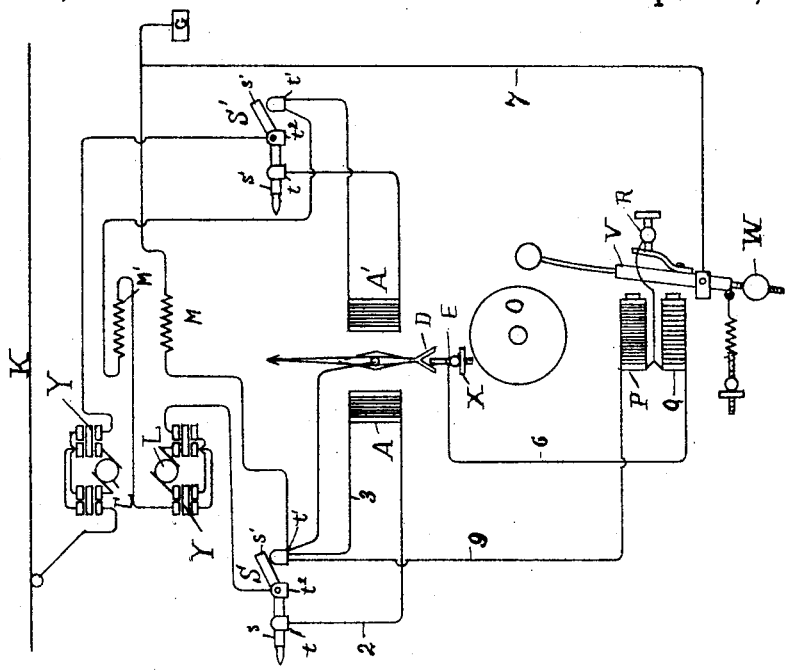
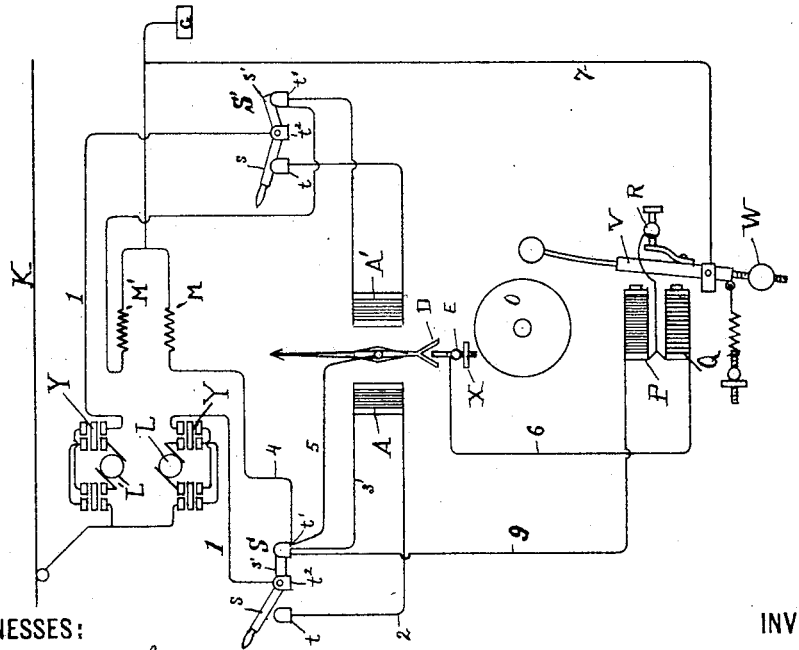

UNITED STATES PATENT OFFICE.

JOHN C. HENRY, OF DENVER, COLORADO.

ELECTRIC MEASURING APPARATUS.

SPECIFICATION forming part of Letters Patent No. 590,263, dated September 21, 1897.

Application filed July 3, 1897. Serial No. 643,348. (No model.)

*To all whom it may concern:*

Be it known that I, JOHN C. HENRY, a citizen of the United States, residing at Denver, in the county of Arapahoe and State of Colorado, have invented certain new and useful Improvements in Electric Measuring Apparatus, of which the following is a specification.

The invention relates to improvements in electric measuring apparatus, its purpose being to show on a single instrument the amount of energy that is being used by a pair of translating devices, although shunt-meters to show either the current or voltage may be used.

The invention is described in connection with use as an ammeter influenced by the entire amount of current which the motors absorb. The instrument is a double arrangement and is intended to indicate the current used on either of the motors separately or to show the discrepancy or difference when they are both working in moving a railroad-car.

In electric railroading the common or almost universal practice is to drive the car with a pair of motors of like capacity. They are supposed to each take an equal share of the work. It frequently happens, however, that owing to defects in the mechanical operation of the car or motors, or owing to electrical defects in the motors or in the switches which control them, the load is unequally divided between the motors. For instance, should there be a tight bearing on one of the motors or the brakes drag against the car-wheels to which it is geared, the motors being connected in parallel, this motor would absorb more current than its mate and would be more liable to injury from overload. Again, should the field-winding on one of the motors be partially short-circuited that motor would take more current than its mate. Again, should one of the motors have a leak, an escape, or partial ground, that side would take more current than the other. Again, should the shunt-wire be connected around the field of one motor and not of another, owing to poor contact in the controller, the former motor would take more current than its mate.

In order to detect any of those or various other troubles to which street-railway motors are heir to, I have provided a single instrument to be connected to a car which is capable of measuring the amount of current absorbed by either motor separately, or which indicates at a glance any variation between the operation of the motors.

While the instrument may be used as a portable or as a stationary car-fixture, the following description refers more particularly to one design for the latter purpose, its main object being to show to the motorman or to the inspector just what the motors are doing under conditions of practice—that is, while the wires are heated and under electrical, mechanical, and magnetic stress.

The dial and pointer are designed, with the accompanying switches, to show the amount of current absorbed by either motor separately, and also to show, on an enlarged scale, any difference between the work being done by the motors.

In addition to the indicating apparatus I provide an instrument with an alarm-bell, the object of this being to call the motorman's instant attention to any unbalanced condition of the motors. The same apparatus is also used to give an alarm when from any cause the motors are receiving an abnormal current.

In testing railway-motors the common practice is to use a Wheatstone bridge and voltmeter. My experience is that instruments handling such delicate currents are unreliable and misleading when used on circuits having superficial contact—such as brushes, controllers, switches, &c.

To illustrate, it is well known that the resistance of superficial or poor contacts vary with the density of the current. Again, they vary with the heating effects. The dense current will heat a poor contact and is liable to increase or decrease the mechanical pressure of the points in engagement, which would also vary the resistance. Again, suppose we have the field-magnets of a motor which has been overloaded and the insulation is slightly charred. When this motor is made to do work, the wire is heated. It expands and compresses the partially-carbonized insulation and reduces the resistance of that particular field-magnet and allows an abnormal current to flow to the armature. In such a case a defective motor which should be at rest is forced to do more than its share of work. As a result the insulation deteriorates and the machine breaks down.

In the drawings, Figure 1 represents a plan view, partially diagrammatic, of the differential ammeter. Fig. 2 represents a side elevation of the same instrument in section. Fig. 3 represents a diagram of the motor-circuits on an electric-railway car having two motors connected in multiple, showing the manner of connecting the differential ammeter and the overload-alarm to the circuits. Fig. 4 is a similar diagram showing the two motors in series.

The differential ammeter I employ consists, essentially, of two similar coils A A', placed parallel, with the diamond-shaped armature B of magnetic material supported between them on shaft or pivot $b$, working on centers $b'$ and carrying the indicating-needle C. A metal fork D is also attached to pivot $b$ and is capable of making contact with a rod E, which is secured by its screw-threaded portion $e$ in the nonconducting plug $e'$, fastened in the outer casing F of the instrument.

A permanent magnet G is arranged with its poles in proximity to the armature B, the lines of force from said magnet lying substantially in a plane at right angles to the common axis of the two coils. The armature B is preferably also permanently magnetized. The aforesaid parts are all supported on a suitable base Z, and a glass cover H is provided for the casing F. Below the cover H is a graduated dial I, over which travels a pointer C, attached to pivot $b$. A pair of double-throw switches S and S' are supported on the same base and are connected with the coils A A', as indicated by dotted lines in Fig. 1.

Referring now to Figs. 3 and 4, the above-described instrument is connected to the motor-circuits, as therein shown, Fig. 3 showing the connections when the motors are placed in parallel and Fig. 4 the connections when said motors are in series. From the line K connection is taken, as usual, to the armatures L and L' and the field-magnets M and M' of the two motors through the usual controlling devices, said controlling devices serving to throw the motors from parallel to series connection in the usual manner. Such controlling devices, being in common use, are not shown, the diagrams indicating only the connections they effect.

The two coils A A' of the differential ammeter are connected, respectively, to the two motor-circuits at such points as to render them independent of the reversals of the armature-currents by the controller. They are here shown as interposed in said circuits between the reversing connections Y for the armature and the field-magnet of the motor. In case reversal of the motor is effected by reversing the field-magnet instead of the armature connections the said coils will still be connected so as to be independent of the reversing connections, the object being to always maintain the current in said coils in the same direction. The switches S and S' are also interposed in these circuits, each switch having a blade $s$, which in conjunction with contact $t$ makes and breaks the circuit of the corresponding ammeter-coil, and a blade $s'$, which coöperates with contact $t'$ to close a shunt around said coil, the said shunt being closed at $t'$ before the circuit of the coil is opened at $t$, as indicated at switch S' in Fig. 3. By means of these switches either one or both of the coils may be thrown into or out of operation, and when the coils are removed from the circuit the main motor-circuits are maintained unbroken and the contacts preserved from flashing and consequent injury.

The circuit of the ammeter-coils may be traced as follows: from the armature L through connection 1 to pivot $t^2$ of switch S, thence through blade $s$, contact $t$, and connection 2 to coil A, and from thence by connection 3 to contact $t'$, and thence by connection 4 to the field of the motor. When either one of the ammeter-coils is thus included in the circuit, the other being disconnected, the current flowing through the corresponding motor will be indicated on the graduated dial I, the readings being taken on the upper scale thereof, the pointer deflecting to the right for one motor and to the left for the other. When both of said coils are put into their respective circuits at the same time, the armature will be acted on by both coils simultaneously as well as by the permanent field, and will take up a position depending on the resultant position of the lines of force. By direct calibration I find that the deflections thus produced, due to a difference of current in the two circuits, is generally considerably greater than a current equal to this difference acting alone would produce, and I therefore draw the lower scale shown to be used when reading such differences. This effect is probably due to the distortion of the field by the strong currents—that is to say, the two strong currents, having a slight difference when acting oppositely in the same field, produce, in addition to their direct effect on the armature due to their difference, a distorting effect in the main field, whereby it is weakened and the deflection is thus increased. Whatever be the cause of this greater sensitiveness of the instrument acting as a differential ammeter, the effect is a matter of actual observation and is of considerable value, as it gives larger deflections when such are very desirable—namely, in indicating a slight difference between two large currents. The instrument may therefore be used as an ammeter for either one of the motors separately, or it may be used to ascertain at any time the relative condition of equality or otherwise of the motors. Thus, supposing both of the coils to be in circuit the needle will respond to any such differences and will show any difference in the currents through the two motors. Such differences may be due to a greater load on one of the motors, due to defects in the gearing or to slipping or other causes, or they may be the result of defects in the insulation, &c., as above pointed out. When the motors are in series relation, any difference observed would indicate a "ground" or partial short-circuit around the other motor, but with the motors in parallel a variety of causes may produce the difference, as above stated. Thus it can at once be ascertained whether the lack of balance of current is due to grounding.

I also provide an alarm which is operated when any of the aforesaid abnormal conditions arise, the same being preferably an electric bell O, whose magnet P is connected in a branch circuit around one of the motor field-magnets, the circuit leading from the line side of said field-magnet by connection 5 to pivot $b$, and from rod E, by connection 6, to magnet Q, and thence to circuit breaker or rheotome R, operated by the armature V of the bell, and thence by connection 7 to ground. Thus any excessive deflection of the differential-ammeter armature would make contact on one side or the other between fork D and rod E, and thus cause the bell to ring. To prevent unnecessary ringing of the bell without momentary flashes of current through the ammeter-coils, due to sudden changes in the controller or to induction-currents, the motion of armature V is preferably retarded in some manner, as by weight W, adjustably secured thereon. When the action of this alarm device is not desired, the rod E is screwed down by means of thumb-nut X, so as to be out of the path of the fork. A second magnet P may be included in another circuit around the field-magnet M, through connection 9, circuit-breaker R, and ground connection 7. This magnet will always exert some attractive effect on the armature V when current is in the motors, but will not ordinarily be strongly enough energized to operate the bell; but in case of the passage of excessive current through the motor, or in case of abnormal increase of resistance in the motor-field, due to the heat increment or to a partial break, this magnet operates armature V and rings the bell. These shunt-circuits around the field-magnet M are of high resistance, so as to take only a small current. It will be understood that in some cases they could be included as shunts around resistances placed in any part of the motor-circuits, the motor-field acting in this sense as a resistance, diverting a part of the current through these shunt-circuits.

Having thus described my invention, what I claim as new, and desire to secure by Letters Patent, is—

1. The combination with two electric motors driving a single vehicle, of two coils connected respectively to the circuits of the said two motors, and a magnetic indicating instrument acted on by both of said coils.

2. The combination with two electric motors driving a single vehicle, of two coils connected respectively in the circuits of the said two motors so as to be responsive to the currents therein, and a magnetic indicating instrument acted on by both of said coils.

3. The combination with two electric motors driving a single vehicle and having reversing connections, of two coils connected respectively to the circuits of the said two motors independently of said reversing connections, and a magnetic indicating instrument acted on by both of said coils.

4. The combination with an electric motor, of an indicating instrument having a coil connected in the circuit of said motor, and a switch having contacts making and breaking the circuit of said instrument-coil, and contacts making and breaking a short circuit around said coil, the short circuit being established before the circuit of said coil is broken.

5. The combination with two electric translating devices, of two coils connected respectively to the circuits of said devices, a magnetic indicating device acted on oppositely by said two coils and having two scales, one corresponding to the action of either coil acting alone, and the other to the action of the two coils acting differentially, the latter scale having larger divisions for equivalent current-indications.

6. The combination with an electric motor, of an alarm device having an electromagnet connected in circuit with said motor, and having an armature with means for retarding its movement, whereby a momentary abnormal current through the motor will not operate the alarm, but a continuance of such abnormal current will operate the same.

7. The combination with two motors driving a single vehicle, of two coils connected respectively in circuit with said two motors, a magnetic device acted on by both said coils, contacts controlled by said magnetic device, and an electromagnetic alarm device having a retarded movement and connected in circuit with said contacts, whereby a continuance of unbalanced condition of the two motors will cause an alarm.

8. The combination with two motors driving a single vehicle, of two coils connected respectively in the circuit of said two motors, a magnetic device acted on by both of said coils, contacts controlled by said magnetic device, and an electric alarm device placed in circuit with said contacts, whereby said alarm is responsive to an overload on the motor.

9. The combination with an electric motor, of a magnet placed in a shunt around the field-magnet of said motor, and alarm devices operated by the said magnet.

10. The combination with an electric motor, of a coil placed in a shunt around the field-magnet of said motor and magnetic indicating devices operated by said coil.

11. The combination with an electric motor, of a magnet placed in shunt around the field-magnet of said motor, and alarm devices operated by said magnet and having a retarded movement, substantially as and for the purpose set forth.

12. The combination with an electric motor, of a coil placed in a shunt around the field-magnet of said motor, a magnetic device operated by said coil, contacts controlled by said magnetic device, and an electric alarm connected in circuit with said contacts and having a retarded movement, substantially as and for the purpose set forth.

JOHN C. HENRY.

Witnesses:
    GEO. H. KNIGHT, Jr.,
    M. C. CUNNINGHAM.